United States Patent
Wang et al.

(10) Patent No.: US 10,924,245 B2
(45) Date of Patent: Feb. 16, 2021

(54) DMRS DESIGN FOR SPS ASSIGNED TRAFFIC

(71) Applicant: QUALCOMM Incorporated, San Diego, CA (US)

(72) Inventors: Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/188,573

(22) Filed: Nov. 13, 2018

(65) Prior Publication Data

US 2019/0173648 A1 Jun. 6, 2019

Related U.S. Application Data

(60) Provisional application No. 62/595,269, filed on Dec. 6, 2017.

(51) Int. Cl.
*H04L 5/00* (2006.01)
*H04L 1/00* (2006.01)
*H04L 1/18* (2006.01)
*H04W 72/04* (2009.01)
*H04L 1/16* (2006.01)

(52) U.S. Cl.
CPC .......... *H04L 5/0053* (2013.01); *H04L 1/0038* (2013.01); *H04L 1/1887* (2013.01); *H04L 5/0044* (2013.01); *H04L 5/0048* (2013.01); *H04L 5/0051* (2013.01); *H04W 72/042* (2013.01); *H04W 72/0446* (2013.01); *H04L 1/1671* (2013.01)

(58) Field of Classification Search
CPC ... H04L 5/0053; H04L 5/0048; H04L 1/1887; H04L 1/0038; H04W 72/042; H04W 72/0446
See application file for complete search history.

(56) References Cited

U.S. PATENT DOCUMENTS

| 10,050,818 B2 * | 8/2018 | Hwang | H04L 27/2613 |
| 2012/0093096 A1 * | 4/2012 | Barbieri | H04J 3/1694 370/329 |
| 2012/0327886 A1 * | 12/2012 | Yu | H04W 72/042 370/329 |
| 2013/0114514 A1 * | 5/2013 | Nissila | H04L 5/0051 370/329 |
| 2013/0201942 A1 * | 8/2013 | Kim | H04L 27/2613 370/329 |

(Continued)

OTHER PUBLICATIONS

International Search Report and Written Opinion—PCT/US2018/061005—ISA/EPO—Jan. 25, 2019.

*Primary Examiner* — Rasheed Gidado

(57) ABSTRACT

The present disclosure relates to an efficient demodulation reference signal (DMRS) design to facilitate a user equipment (UE) in performing blind detection of a DMRS sequence to determine if a transmission includes data for the UE. Specifically, features of the present disclosure implement techniques that use DMRS design to facilitate blind detection of a DMRS sequence in order for the UE to determine whether a packet for the UE was transmitted during a particular SPS slot. By utilizing the techniques described herein, the base station may forego using PDCCH to provide new allocation information each time that a packet misses the assigned SPS slot.

20 Claims, 7 Drawing Sheets

(56) References Cited

U.S. PATENT DOCUMENTS

| | | | |
|---|---|---|---|
| 2015/0085728 A1* | 3/2015 | Majjigi | H04W 76/28 370/311 |
| 2015/0282124 A1* | 10/2015 | Miao | H04W 72/042 455/450 |
| 2016/0028521 A1 | 1/2016 | Shimezawa et al. | |
| 2018/0006864 A1* | 1/2018 | Hwang | H04L 27/2613 |
| 2018/0213457 A1* | 7/2018 | Tang | H04W 36/0083 |
| 2018/0324830 A1* | 11/2018 | Islam | H04W 72/1236 |
| 2019/0089560 A1* | 3/2019 | Baldemair | H04L 5/0058 |
| 2019/0166614 A1* | 5/2019 | Byun | H04L 25/02 |

* cited by examiner

DMRS DESIGN FOR SPS ASSIGNED TRAFFIC

CROSS-REFERENCE TO RELATED APPLICATION(S)

This application claims benefit of U.S. Provisional Ser. No. 62/595,269, entitled "DMRS DESIGN FOR SPS ASSIGNED TRAFFIC" and filed Dec. 6, 2017, which is expressly incorporated by reference herein in its entirety.

BACKGROUND

The present disclosure relates generally to communication systems, and more particularly, to improving demodulation reference signal (DMRS) design for semi-persistent scheduling (SPS) of traffic from a base station to one or more user equipment(s) (UEs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

One such need for improvement relates to management of SPS traffic. Generally, for industrial Internet of Things (IoT) devices, there may be periodic downlink traffic (e.g., periodic control packets) sent from the network (e.g., base station) to IoT devices. To address this need, a SPS may be utilized by the base station such that each UE may be allocated a SPS slot during an SPS period that is periodically transmitted by the base station. Each UE, during its respective assigned SPS slot, may expect to receive traffic from the base station that is addressed to the UE. However, due to delays in the network, the base station itself may not receive the packet in time from the backend network to allow the base station to transmit the packet to the UE during the assigned SPS slot.

For packets that miss the assigned SPS slot, current systems attempt to address the above-identified problem by utilizing dynamic scheduling. In such systems, the base station may transmit new allocation information (e.g., notifying the UE that the packet will be transmitted in a different slot) in the physical downlink control channel (PDCCH) to each UE that is impacted by the rescheduling. The new allocation information is generally carried by downlink control information (DCI). However, PDCCH has a limited capacity. As such, reliance on the PDCCH to carry new allocation information may not be feasible where a series of packets miss the respective assigned SPS slots to a plurality of UEs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure relates to an efficient demodulation reference signal (DMRS) design to facilitate a user equipment (UE) in performing blind detection of a DMRS sequence to determine if a transmission includes data for the UE. Specifically, features of the present disclosure implement techniques that use DMRS design to facilitate blind detection of a DMRS sequence in order for the UE to determine whether a packet for the UE was transmitted during a particular SPS slot. By utilizing the techniques described herein, the base station may forego using PDCCH to provide new allocation information each time that a packet misses the assigned SPS slot.

In some examples, a method for wireless communications is disclosed. The method may include receiving, at a UE, a DMRS during a semi-persistent scheduling (SPS) slot. The method may further include selecting a DMRS sequence from a plurality of DMRS sequences in order to detect the DMRS. The method may further include determining whether a packet transmitted during the SPS slot is intended for the UE based on detecting the DMRS using the selected DMRS sequence.

In another example, a UE for wireless communications is disclosed. The UE may include a processor and a memory in communication with the processor. The memory may include instructions executable by the processor to receive, at a UE, a DMRS during a SPS slot, and select a DMRS sequence from a plurality of DMRS sequences in order to detect the DMRS. The instructions may further be executable by the processor to determine whether a packet transmitted during the SPS slot is intended for the UE based on detecting the DMRS using the selected DMRS sequence.

In another example, a computer readable medium comprising code for wireless communications may be disclosed. The computer readable medium may include code for receiving, at a UE, a DMRS during a SPS slot. The computer readable medium may further include code for selecting a DMRS sequence from a plurality of DMRS sequences in order to detect the DMRS. The computer readable medium may further include code for determining whether a packet transmitted during the SPS slot is intended for the UE based on detecting the DMRS using the selected DMRS sequence.

In another example, an apparatus for wireless communications is disclosed. The apparatus may include means for receiving, at a UE, a DMRS during a SPS slot. The apparatus may further include means for selecting a DMRS sequence from a plurality of DMRS sequences in order to detect the DMRS. The apparatus may further include means for determining whether a packet transmitted during the SPS slot is intended for the UE based on detecting the DMRS using the selected DMRS sequence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
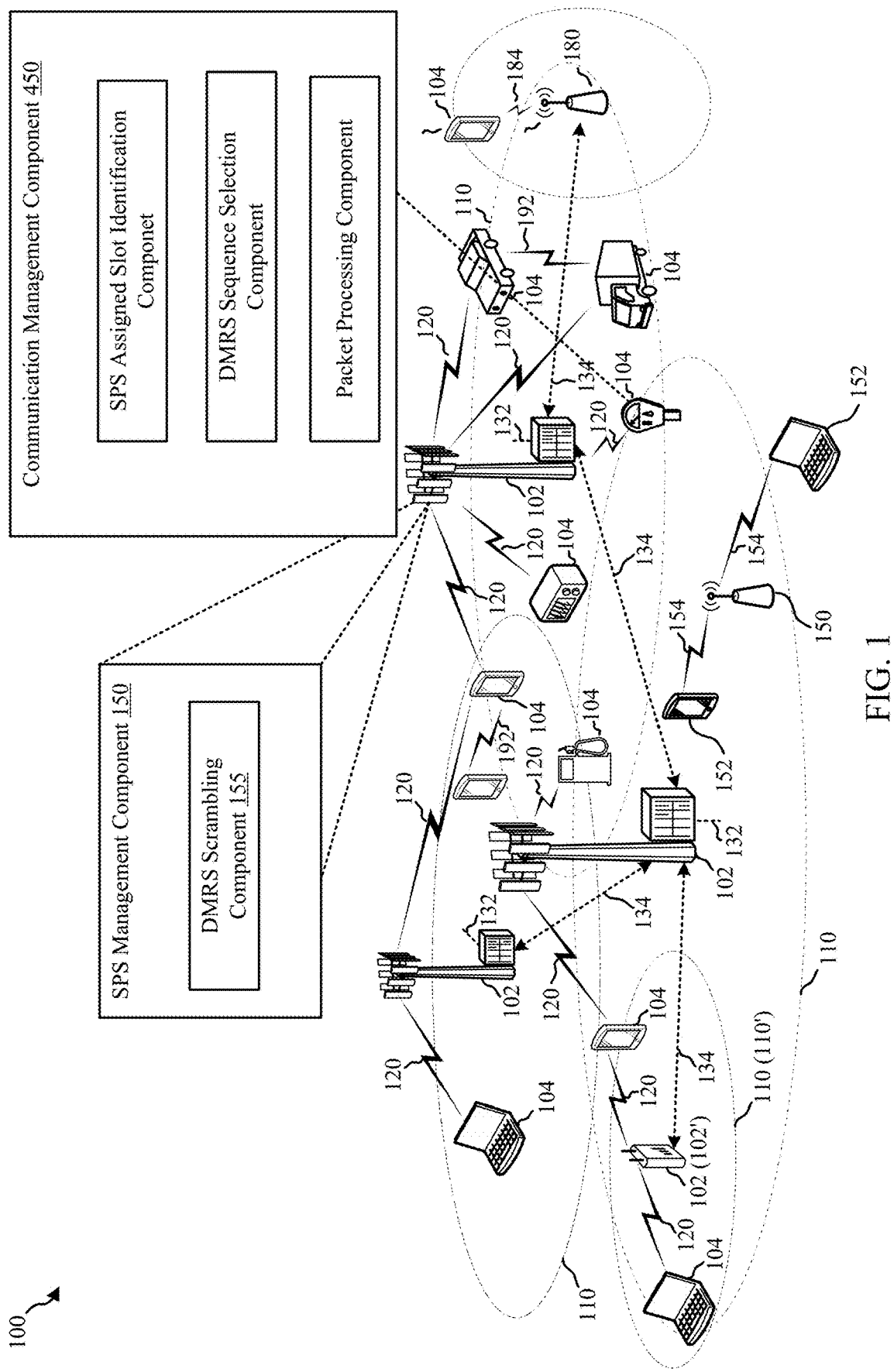
FIG. 1 is a diagram illustrating an example of a wireless communications system and an access network.

The present disclosure relates to an efficient demodulation reference signal (DMRS) design to facilitate a UE in performing blind detection of a DMRS sequence to determine if a transmission includes data for the UE. As discussed above, semi-persistent scheduling (SPS) may be utilized to schedule periodic data transmissions, such as in instances where one or more IoT devices (e.g., UEs) are configured to receive periodic downlink traffic (e.g., periodic control packets) from the base station. Specifically, in SPS, a set of resources and transport formats are pre-allocated and are persistently maintained during a specific time interval. As a result, some SPS parameters (e.g., periodicity) are configured semi-statically through radio resource control (RRC) signaling. For example, when a predetermined amount of data is transmitted during a specific time interval in the same way, control information need not be transmitted for each data transmission interval for resource allocation.

To implement SPS, a base station may allocate an assigned SPS slot to a UE. Thus, during the SPS period (e.g., 20 ms), each UE may decode traffic received during the SPS slot that is specifically assigned to that UE. However, due to delays in the network, the base station itself may not receive the packet in time from the network to allow the base station to transmit the downlink packet to the UE during the assigned SPS slot. Because the UE may only expect traffic on a particular SPS slot (by decoding only the packet transmitted in assigned SPS slot), the UE may miss the packet transmitted by the base station.

Some systems have attempted to address the issue of missed packets by utilizing dynamic scheduling that transmits new allocation information (e.g., downlink control information (DCI), notifying the UE that the packet will be transmitted in a different slot) in the physical downlink control channel (PDCCH) to each UE that may be impacted by the delay. However, because the PDCCH has limited capacity, reliance on the PDCCH to carry new allocation information may not be feasible when a significant number of packets miss the respective assigned SPS slots.

Features of the present disclosure addresses the above-identified problem by implementing techniques that use DMRS design to facilitate blind detection of a DMRS sequence in order for the UE to determine whether a packet for the UE was transmitted during a particular SPS slot. By utilizing the techniques described herein, the base station may forego using PDCCH to provide new allocation information each time that a packet misses the assigned SPS slot.

Generally, the DMRS is used for downlink channel estimation for a specific UE in order to facilitate coherent demodulation of physical downlink shared channel (PDSCH). In a given subframe, the DMRS may be transmitted within the resource blocks (RBs) that are used for PDSCH transmission to the specific UE within the subframe. Because a wireless communication systems may support co-scheduling of a plurality of UEs, the DMRS for one UE may be distinguished from the DMRS for another UE by scrambling the sequences for each DMRS using a pseudo-random sequence generator. The UE receiving the DMRS may be aware of the scrambling sequence associated with that UE alone. As such, the UE may be able to determine whether the received DMRS is for that specific UE by detecting the DMRS using the known scrambling sequence. Thus, if a data packet designated for the UE is transmitted in a SPS slot by the base station, the UE may be able to determine as much by detecting if a DMRS for the UE is also transmitted in the subframe.

However, blindly detecting DMRS may not be infallible. For example, DMRS sequences for different packets may not be sufficiently separated in order to reject noise (e.g., two DMRS sequences for different packets may only differ by one position). In other examples, the length of the DMRS sequence may be too short to have sufficient processing gain (e.g., small packet transmitted using one RB may have DMRS sequence of length of only 12 tones).

Thus, in order to resolve the limitations of blind detection of the DMRS, features of the present disclosure implement techniques to design an efficient (e.g., well separated) DMRS sequence. In one implementation, the DMRS sequence set may be selected from a set of predetermined DMRS sequences based on offset of the packet transmit slot and the SPS assigned packet slot. In second implementation, the DMRS sequence may be based on a traffic type such that the DMRS sequence length may be more robust (e.g., 36 tones across three RBs in contrast to 12 tones in current systems transmitted on a single RB) for detection than conventional systems.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) The one or more UEs 104 may include a communication management component 450 to perform one or more methods (e.g., method 500) to support blind detection of a DMRS sequence to determine which traffic is transmitted in any particular SPS slot. In some examples, the communication management component 450 may implement techniques that select a DMRS sequence set based on an offset of a true packet transmit slot and an SPS assigned slot. The term "true packet transmit slot" may refer to a current slot in which an SPS packet is transmitted, which may be different from an originally-scheduled transmit slot, e.g., the SPS assigned slot. In other examples, the mobile communication component 450 may implement techniques that select a DMRS sequence set for use in blind detection based on traffic type. In this example, the DMRS sequence set may be transmitted on multiple resource blocks and include a more robust sequence length than its conventional counterpart. The components and subcomponents (e.g., SPS assigned slot identification component, DMRS sequence selection component, packet processing component) of the communication management component 450 are described in more detail with reference to FIG. 4A below.

In some examples, the base station 102 may include an SPS management component 150 for allocating the SPS slots to one or more UEs 104. The SPS management component 150 may further include a DMRS scrambling component 155 for selecting DMRS sequences from a plurality of DMRS sequences based on the offset value between the current SPS slot and the assigned SPS slot for the UE 104. In some examples, the DMRS scrambling component 155 may also transmit a DMRS across a plurality of RBs in order to allow for improved detection of the DMRS by the UE 104. The components and subcomponents of the SPS management component 150 are described in more detail with reference to FIG. 4B below.

The base stations 102 may include macro cells (high power cellular base station) and/or small cells (low power cellular base station). The macro cells include base stations. The small cells include femtocells, picocells, and microcells. The base stations 102 (collectively referred to as Evolved Universal Mobile Telecommunications System (UMTS) Terrestrial Radio Access Network (E-UTRAN)) interface with the EPC through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
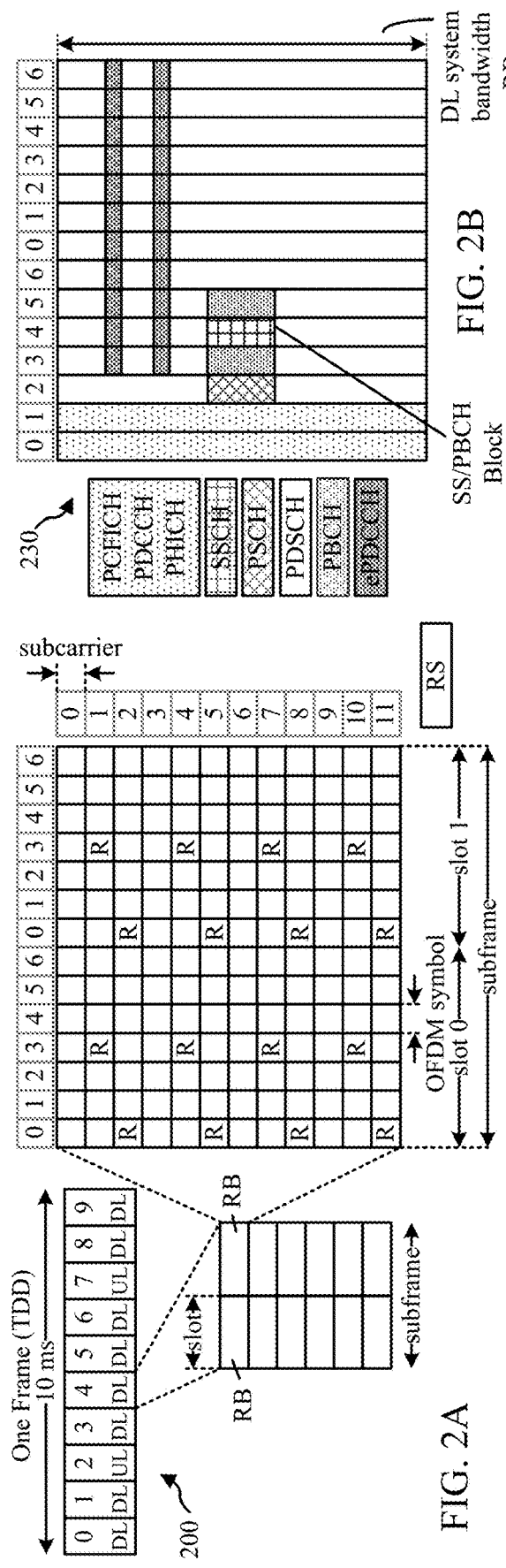
FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIGS. 2A-2D are diagrams illustrating examples of a DL subframe, DL channels within the DL subframe, an UL subframe, and UL channels within the UL subframe, respectively, for a 5G/NR frame structure that may be utilized by UE 104 and/or base station 102 according to one or more aspects described herein. For example, FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include beam measurement RS (BRS), beam refinement RS (BRRS), and phase tracking RS (PT-RS). The RS may also include demodulation RS (DM-RS) and channel state information reference signals (CSI-RS) for channel estimation at the UE. In a given subframe, the DMRS may be transmitted within the RBs that are used for PDSCH transmission to the specific UE within the subframe. Because a wireless communication systems may support co-scheduling of a plurality of UEs, the DMRS for one UE may be distinguished from the DMRS for another UE by scrambling the sequences for each DMRS. The UE receiving the DMRS may be aware of the scrambling sequence associated with that UE alone. As such, the UE may be able to determine whether the received DMRS is for that specific UE by detecting the DMRS using the known scrambling sequence. Thus, if a data packet, designated for the UE, is transmitted in a SPS slot by the base station, the UE may be able to determine as much by detecting if a DMRS for the UE is also transmitted in the subframe. Features of the present disclosure implement techniques to design an efficient (e.g., well separated) DMRS sequence. In one implementation, the DMRS sequence set may be selected from a set of predetermined DMRS sequences based on an offset between the packet transmit slot and the SPS assigned packet slot. In second implementation, the DMRS sequence may be based on the traffic type, such that the DMRS sequence length may be more robust (e.g., 36 tones across three RBs in contrast to 12 tones in current systems transmitted on a single RB).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3A:
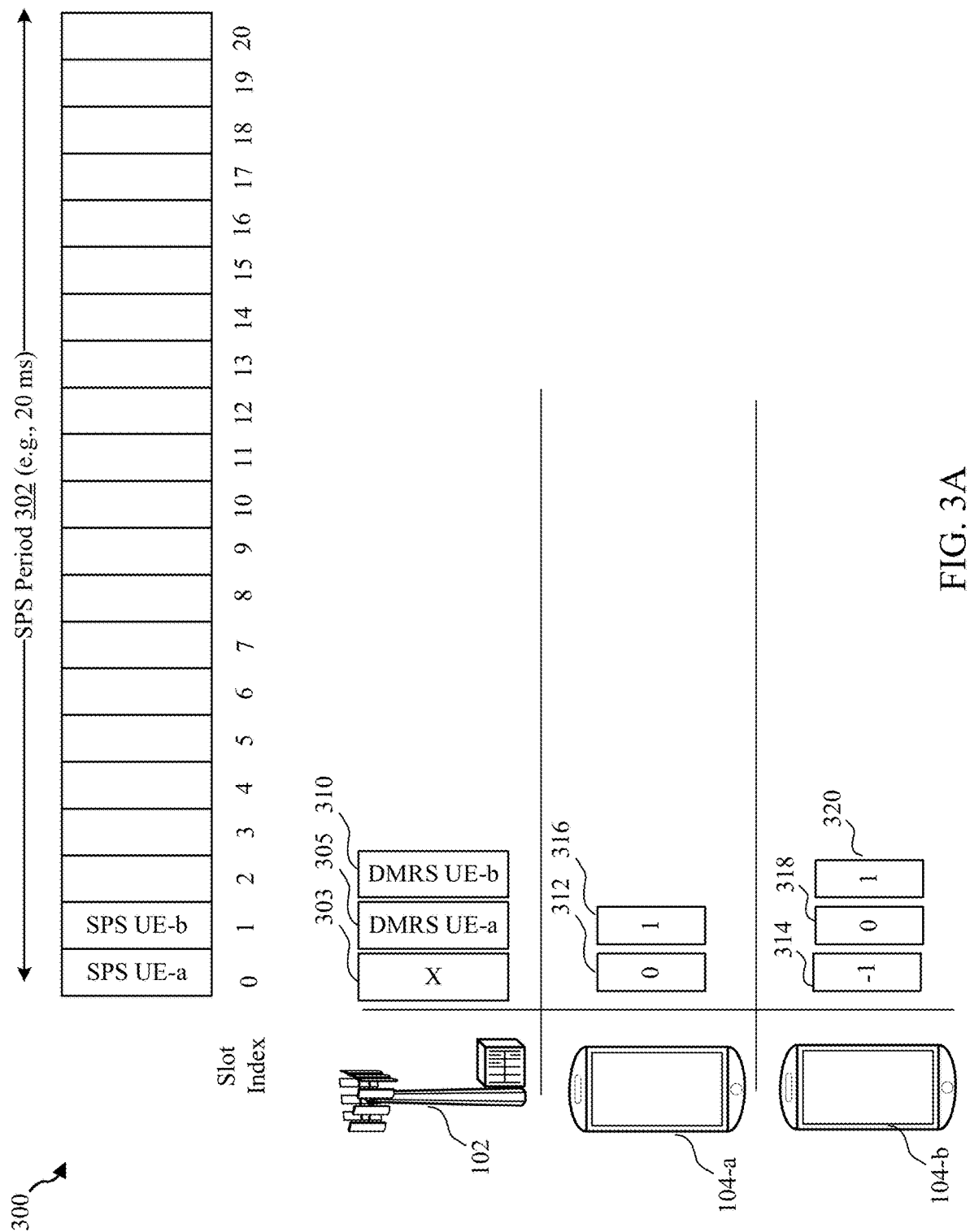
FIGS. 3A and 3B are diagrams illustrating examples of implementing DMRS detection during SPS period in accordance with the present disclosure.

Turning next to FIG. 3A, the diagram 300 illustrates an example of techniques implemented by one or more UEs 104 (e.g., first UE 104-*a* and second UE 104-*b*) for detecting DMRS transmitted by a base station 102 in order to identify whether the base station 102 has transmitted a packet intended for the UE 104 in a respective SPS slot within an SPS period 302. As discussed above, SPS may be utilized in instances where one or more IoT devices (e.g., UEs 104) are configured to receive periodic downlink traffic (e.g., periodic control packets) from the base station 102. Specifically, in SPS, a set of resources and transport formats are pre-allocated and are persistently maintained during a specific time interval. As a result, some SPS parameters (e.g., periodicity) are configured semi-statically through radio resource control (RRC) signaling. For example, when a predetermined amount of data is transmitted during a specific time interval in the same way, control information need not be transmitted for each data transmission interval for resource allocation. Thus, the amount of control information that is transmitted may be reduced when using SPS.

To implement SPS, a base station 102 may allocate an assigned SPS slot to a UE. For example, the base station 102 may allocate slot 0 to first UE 104-*a* and slot 1 to second UE 104-*b* within SPS period 302. In this example, slot 2 may be unassigned. Thus, during the SPS period 302 (e.g., 20 ms), each UE 104 may expect packets intended for that UE during the assigned SPS slots (e.g., first UE 104-*a* during slot 0 and second UE 104-*b* during slot 1). However, due to delays in the network, the base station 102 itself may not receive the packet in time from the network to allow the base station 102 to transmit the downlink packet to the UE 104 during the assigned SPS slot.

For example, the base station 102 may fail to receive a packet intended for the first UE 104-*a* prior to first SPS slot (SPS slot index 0) that is assigned to the first UE 104-*a*. As such, the first slot may be wasted because the base station 102 may not transmit any downlink traffic during the first slot. However, if the packet intended for the first UE 104-*a* arrives prior to the second SPS slot (SPS slot index 1), the base station 102 may transmit downlink traffic to the first UE 104-*a* in the second SPS slot even if the second SPS slot is allocated to a different UE (e.g., second UE 104-*b*) and the traffic for the second UE 104-*b* is available for transmission during the allocated time period. Thus, in the illustrated example, the packet intended for first UE 104-*a* may be delayed by one SPS slot (transmitting during SPS slot 1 instead of SPS slot 0). Similarly, the packet intended for the second UE 104-*a* may also be delayed by one SPS slot (transmitting during SPS slot 2 instead of SPS slot 1).

In order to account for the delay, and without relying on DCI carrying new allocation information in the PDCCH, each of the one or more UEs 104 may determine whether a packet intended for that UE 104 is transmitted in any given SPS slot by blindly detecting a DMRS in the slot. If the UE-specific DMRS is detected, the UE 104 may be able to determine that the packet intended for that UE is also included in that SPS slot. However, as noted above, simply blindly detecting DMRS may not always be possible because DMRS sequences for different packets may not be sufficiently separated in order to reject noise (e.g., two DMRS sequences for different packets may only differ by one position). In other examples, the length of the DMRS sequence may be too short to have sufficient processing gain (e.g., small packet transmitted using one RB may have DMRS sequence of length of only 12 tones). Thus, in order to resolve one or more of the limitations of blind detection of the DMRS, features of the present disclosure implement techniques to select a DMRS sequence that provides for more robust detection by providing adequate spacing between different DMRS sequences for different UEs.

In one implementation, the DMRS sequence may be selected from a plurality of available DMRS sequences based on an offset value between the true packet transmit slot (e.g., "current SPS slot") and the assigned SPS slot that is allocated to the UE 104. The plurality of available DMRS sequences may be dependent on the maximum number of slots (N) that a packet may be moved from its originally assigned slot. For example, if the value of N is set to 2 (maximum number of slots that the packet can move—either before or after assigned SPS slot—is two slots), the total number of available DMRS sequences would be 5 DMRS sequences (two DMRS sequences for two SPS slots prior to the assigned SPS slot, one DMRS sequence for the assigned SPS slot, and two additional DMRS sequences for two slots post the assigned SPS slot). Thus, in present example, the number of DMRS sequences may not depend on the number of UEs 104 in the cell, but rather on the maximum number of slots that the packet can be offset from the originally assigned SPS slot.

Returning to the illustrated example, due to delay at the backend network, the packet intended for first UE 104-*a* may be delayed by one SPS slot (transmitting during SPS slot 1 instead of SPS slot 0). Similarly, the packet intended for the second UE 104-*a* may also be delayed by one SPS slot (transmitting during SPS slot 2 instead of SPS slot 1). The base station 102 may communicate the reassignment by transmitting a UE-specific DMRS during the respective SPS slots. In this instance, the DMRS sequence may be selected based on the offset value of the SPS slot in which the base station 102 is transmitting the packet in comparison to the assigned SPS slot. The receiving UE 104 may similarly detect the DMRS using a DMRS sequence that is based on the offset value.

For example, during the first SPS slot (SPS slot 0), the base station 102 may not transmit any data, and thus may select no DMRS 303 (as indicated by an "X"). the first UE 104-*a* may select a slot-specific blind detect DMRS sequence 312, e.g., DMRS sequence 0, from the plurality of available DMRS sequences since there is no offset between the current SPS slot (SPS slot 0) and the assigned SPS slot (SPS slot 0). During the same first slot (SPS slot 0), the second UE 104-*b*, however, may select a different slot-specific blind detect DMRS sequence 314 based on slot offset value of −1 because the first slot (SPS slot 0) is one slot prior to the assigned SPS slot (SPS slot 1) allocated to the second UE 104-*b*. In this instance, both the first UE 104-*a* and the second UE 104-*b* would fail to detect the DMRS based on the respective DMRS sequences because the base station 102 failed to transmit any packet during the first SPS slot (SPS slot 0).

Further, for the second SPS slot (SPS slot 1), the base station 102 may transmit a first DMRS 305 intended for first UE 104-*a* based on transmitting a packet for first UE 104-*a* in SPS slot 1. The base station 102 may select the DMRS sequence 1 for the DMRS 305 based on the slot offset value of 1 because transmitted packet is the first packet intended for first UE 104-*a* that is delayed by one slot (i.e., transmitted in SPS slot 1 instead of assigned SPS slot 0). On the receiver side, each UEs 104 may select DMRS sequences based on their respective offset from the assigned SPS slots. For example, the first UE 104-*a* may select slot-specific blind detect DMRS sequence 316, e.g., DMRS sequence 1, and the second UE 104-*b* may select slot-specific blind detect DMRS sequence 318, e.g., DMRS sequence 0, during the second slot (SPS slot 1). This is because, as explained above, there is no offset for the second UE 104-*b* while there is an offset of one for first UE 104-*a*.

In this example, the first UE 104-*a* may successfully detect the first DMRS 305 transmitted by the base station 102 using the slot-specific blind detect DMRS sequence 316, e.g., DMRS sequence 1. By detecting the first DMRS 305, the first UE 104-*a* may determine that the first packet is also transmitted during second SPS slot (SPS slot 1). In contrast, the second UE 104-*b* would fail to successfully detect the first DMRS 305 because the base station 102 selected a DMRS sequence 1 while the second UE 104-*b*, during the same SPS slot, selected slot-specific blind detect DMRS sequence 318, e.g., DMRS sequence 0. As such, the second UE 104-*b* would be unable to detect the first DMRS 305, and thereby be able to determine that the packet transmitted during the second SPS slot is not intended for the second UE 104-*b*.

Subsequently, during the third SPS slot (SPS slot 2), the base station 102 may transmit the second packet intended for the second UE 104-*b* along with the second DMRS 310. With respect to the second DMRS 310, the base station 102 may select a DMRS sequence 1 due to the fact that the second packet is delayed by one slot (slot offset value=1). In this instance, the second UE 104-*a* may also select slot-specific blind detect DMRS sequence 320, e.g., DMRS sequence 1, based on the slot offset value of 1 and successfully detect the DMRS 310 to determine that the packet transmitted during the third SPS slot is intended for the second UE 104-*b*. Because the first UE 104-*a* already received its packet during the second SPS slot (SPS slot 1), the first UE 104-*a* may elect to ignore detecting the second DMRS 310. Alternatively, a UE (such as first UE 104) may not perform blind detection in a slot in the case where a given slot is beyond where a packet transmission may be moved. Thus, as illustrated above, by implementing the techniques outlined here, the base station 102 may be able to signal the reassignment of packets from originally assigned SPS slots without relying on the DCI to carry new allocation information in the PDCCH.

Figure 3B:
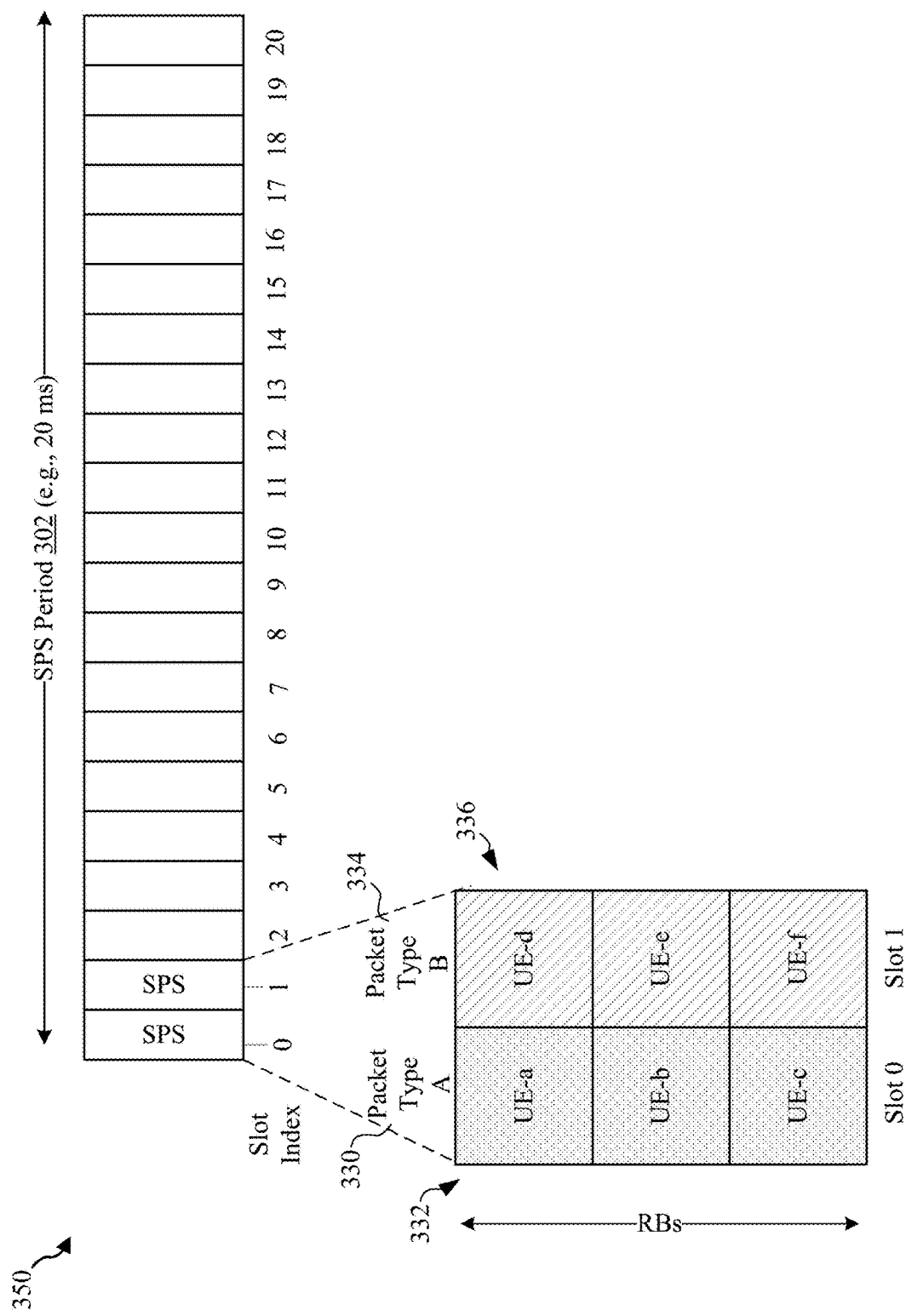

Additionally or alternatively, turning next to FIG. 3B, a diagram 350 illustrates an example of technique that allows the base station 102 to use DMRS scrambling across multiple packets and across multiple frequency bands so that detection of the DMRS by one or more UEs 104 is more accurate than conventional systems. Specifically, in factory automation, the packet for each UE 104 is usually relatively small. As such, the time frequency dimension is also relatively small. In this instance, scrambling DMRS based on a single packet for one UE 104 in a small frequency band may not be reliable for a receiving UE 104 to detect if DMRS intended for that UE 104 is present in a SPS slot. However, due to different types of traffic that are transmitted by the base station 102, the base station 102 may leverage the similar types of packets to use DMRS scrambling across multiple packets. As such, the DMRS for each packet type may be spread across multiple RBs (e.g., 3 RBs over 36 tones in contrast to 1 RB over 12 tones for current systems).

Thus, as illustrated in diagram 350, a base station 102 may be scheduled to transmit a first type 332 of data packet to first set 334 of UEs 104 (e.g., UE-a, UE-b, and UE-c) in SPS assigned slot 0. The base station 102 may also be scheduled to transmit a second type 336 of data packet to a second set 338 of UEs 104 (e.g., UE-d, UE-e, and UE-f). In current systems, each packet may occupy only one RB and thus the DMRS may be spread across a narrow frequency bandwidth. Features of the present disclosure, however, leverage the similar types of data packet types to transmit DMRS sequence across multiple resource blocks. For example, in the first SPS slot (SPS slot 0), the base station 102 may transmit the first type 330 of traffic and corresponding DMRS sequence to the first set 332 of UEs 104, where the DMRS sequence may be spread across all three RBs. Similarly, the base station 102 may transmit the second type 334 of data packets and corresponding DMRS sequence to the second set 336 of UEs 104 during the second SPS slot (SPS slot 1), where the DMRS sequence is spread across three RBs. For example, e.g., for the first UE (e.g., UE-a) to detect if its packet of type A is sent in slot 0, it uses a blind detection scheme with DMRS sequence for 3 RB, which is more robust then using a DMRS sequence for 1 RB. Thus, by selecting DMRS based on traffic type, the detection of DMRS sequence may be more robust for the UE 104 because the DMRS sequence is spread across a greater number of RBs than would otherwise be possible.

Figure 4A:
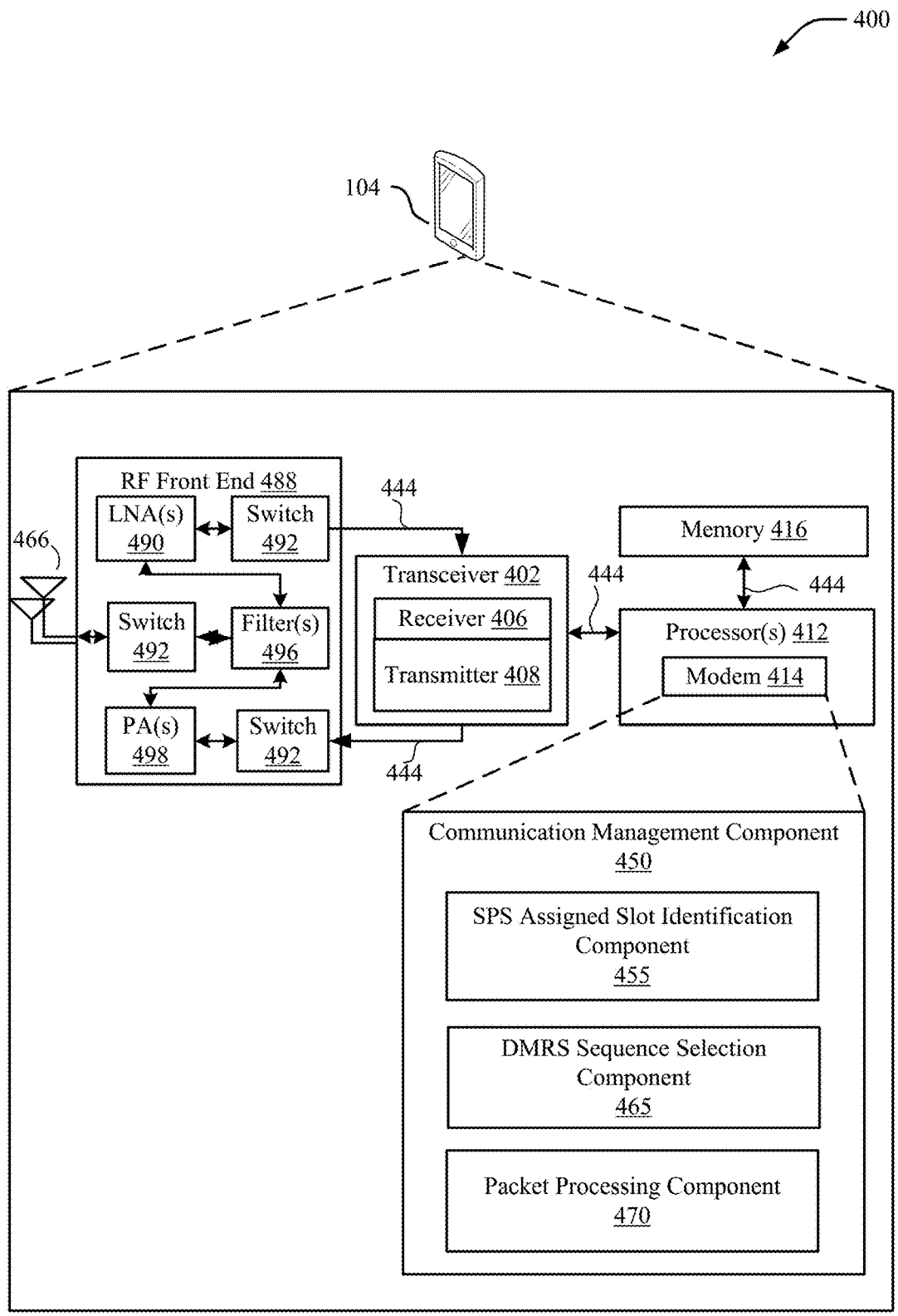
FIG. 4A shows an example schematic diagram of the hardware of the UE 102 that includes components and subcomponents for implementing the techniques of the present disclosure.

FIG. 4A describes hardware components and subcomponents of a UE 104 for implementing one or more methods (e.g., method 500) described herein in accordance with various aspects of the present disclosure. For example, one example of an implementation of the UE 104 may include a variety of components, some of which have already been described above, but including components such as one or more processors 412 and memory 416 and transceiver 402 in communication via one or more buses 444, which may operate in conjunction with the communication management component 450 for selecting a DMRS sequence in order to identify whether a data packet intended for the UE 104 is included in an SPS slot.

In some examples, the communication management component 450 may include a SPS assigned slot identifier 455 that maintains the SPS slot assigned to the UE 104 by the base station 102. In some examples, the SPS parameters (e.g., periodicity) may be configured semi-statically through radio resource control (RRC) signaling and information associated with the SPS parameters may be maintained by the SPS assigned slot identifier 455. During each SPS assigned slot, the UE 104 may expect to receive periodic downlink traffic (e.g., periodic control packets) from the base station.

The communication management component 450 may also include a DMRS sequence selection component 465 for selecting, during each SPS slot, a DMRS sequence based on either the offset of the packet transmit slot (e.g., current slot) and the SPS assigned slot. In other examples, the DMRS sequence selection component 465 may select a DMRS sequence based on the type of packet transmitted by the base station. In this example, the DMRS sequence may be based on the traffic type such that the DMRS sequence length may be more robust (e.g., 36 tones across three RBs in contrast to 12 tones in current systems transmitted on a single RB) for detection than conventional systems.

Further, the communication management component 450 may also include packet processing component 470. In some examples, if the UE 102 is able to detect the DMRS to determine that the DMRS is indeed intended for the UE 102, the packet processing component 470 may decode the packet received in the subframe during the SPS slot. However, if the UE 102 is unable to detect the DMRS, the packet processing component 470 may determine that the packet is intended for another UE, and as such reject further decoding of the packet received in the subframe during the SPS slot.

The one or more processors 412, modem 414, memory 416, transceiver 402, RF front end 488 and one or more antennas 466, may be configured to support voice and/or data calls (simultaneously or non-simultaneously) in one or more radio access technologies. In an aspect, the one or more processors 412 can include a modem 414 that uses one or more modem processors. The various functions related to communication management component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with communication management component 450 may be performed by transceiver 402.

Also, memory 416 may be configured to store data used herein and/or local versions of applications or communication management component 450 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining communication management component 450 and/or one or more of its subcomponents, and/or data associated therewith, when UE 104 is operating at least one processor 412 to execute communication management component 450 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by at least one UE 115. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, the UE 102 may include RF front end 488, which may operate in communication with one or more antennas 466 and transceiver 402 for receiving and transmitting radio transmissions, for example, wireless communications transmitted by at least one base station 102 or wireless transmissions transmitted by UE 104. RF front end 388 may be connected to one or more antennas 466 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 466 via RF front end 488. In an aspect, transceiver may be tuned to operate at specified frequencies such that transmitting device can communicate with, for example, one or more base stations 102 or one or more cells associated with one or more base stations 105. In an aspect, for example, modem 414 can configure transceiver 402 to operate at a specified frequency and power level based on the configuration of the transmitting device and the communication protocol used by modem 414.

In an aspect, modem 414 can be a multiband-multimode modem, which can process digital data and communicate with transceiver 402 such that the digital data is sent and received using transceiver 402. In an aspect, modem 414 can be multiband and be configured to support multiple frequency bands for a specific communications protocol. In an aspect, modem 414 can be multimode and be configured to support multiple operating networks and communications protocols. In an aspect, modem 414 can control one or more components of transmitting device (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on UE 104 configuration information as provided by the network during cell selection and/or cell reselection.

Figure 4B:
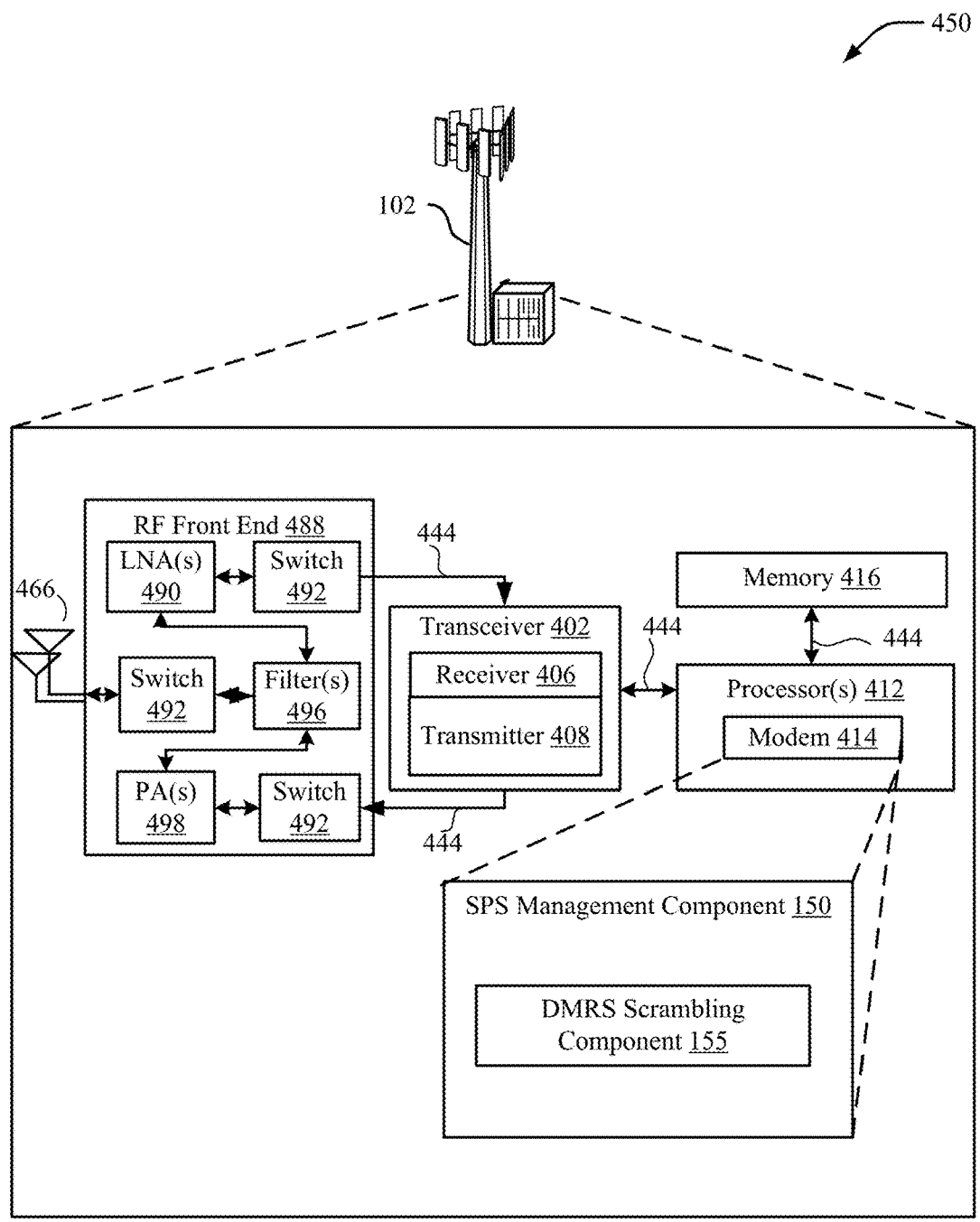
FIG. 4B shows an example schematic diagram of the hardware of the base station 104 that includes components and subcomponents for implementing the techniques of the present disclosure.

FIG. 4B describes hardware components and subcomponents of a base station 102 for implementing one or more methods described herein in accordance with various aspects of the present disclosure. For example, one example of an implementation of the base station 102 may include a variety of components, some of which have already been described above, but including components such as one or more processors 412 and memory 416 and transceiver 402 in communication via one or more buses 444, which may operate in conjunction with an SPS management component 150 for managing the SPS allocations and transmissions of DMRS signals.

In some examples, an SPS management component 150 may include a DMRS scrambling component 155 for selecting DMRS sequences from a plurality of DMRS sequences based on the offset value between the current SPS slot and the assigned SPS slot for the UE 104. In some examples, the DMRS scrambling component 155 may also transmit a DMRS across a plurality of RBs in order to allow for improved detection of the DMRS by the UE 104.

The one or more processors 412, modem 414, memory 416, transceiver 402, RF front end 488 and one or more antennas 466, may be configured to support voice and/or data calls (simultaneously or non-simultaneously) in one or more radio access technologies. In an aspect, the one or more processors 412 can include a modem 414 that uses one or more modem processors. The various functions related to communication management component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with SPS management component 150 may be performed by transceiver 402.

Also, memory 416 may be configured to store data used herein and/or local versions of applications or SPS management component 150 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining SPS management component 150 and/or one or more of its subcomponents, and/or data associated therewith, when base station 102 is operating at least one processor 412 to execute SPS management component 150 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by at least one SPS management component 150. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, the SPS management component 150 may include RF front end 488, which may operate in communication with one or more antennas 466 and transceiver 402 for receiving and transmitting radio transmissions, for example, wireless communications transmitted by at least one base station 102 or wireless transmissions transmitted by SPS management component 150. RF front end 388 may be connected to one or more antennas 466 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 466 via RF front end 488. In an aspect, transceiver may be tuned to operate at specified frequencies such that transmitting device can communicate with, for example, one or more base stations 102 or one or more cells associated with one or more base stations 105. In an aspect, for example, modem 414 can configure transceiver 402 to operate at a specified frequency and power level based on the configuration of the transmitting device and the communication protocol used by modem 414.

In an aspect, modem 414 can be a multiband-multimode modem, which can process digital data and communicate with transceiver 402 such that the digital data is sent and received using transceiver 402. In an aspect, modem 414 can be multiband and be configured to support multiple frequency bands for a specific communications protocol. In an aspect, modem 414 can be multimode and be configured to support multiple operating networks and communications protocols. In an aspect, modem 414 can control one or more components of transmitting device (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on UE 104 configuration information as provided by the network during cell selection and/or cell reselection.

Figure 5:
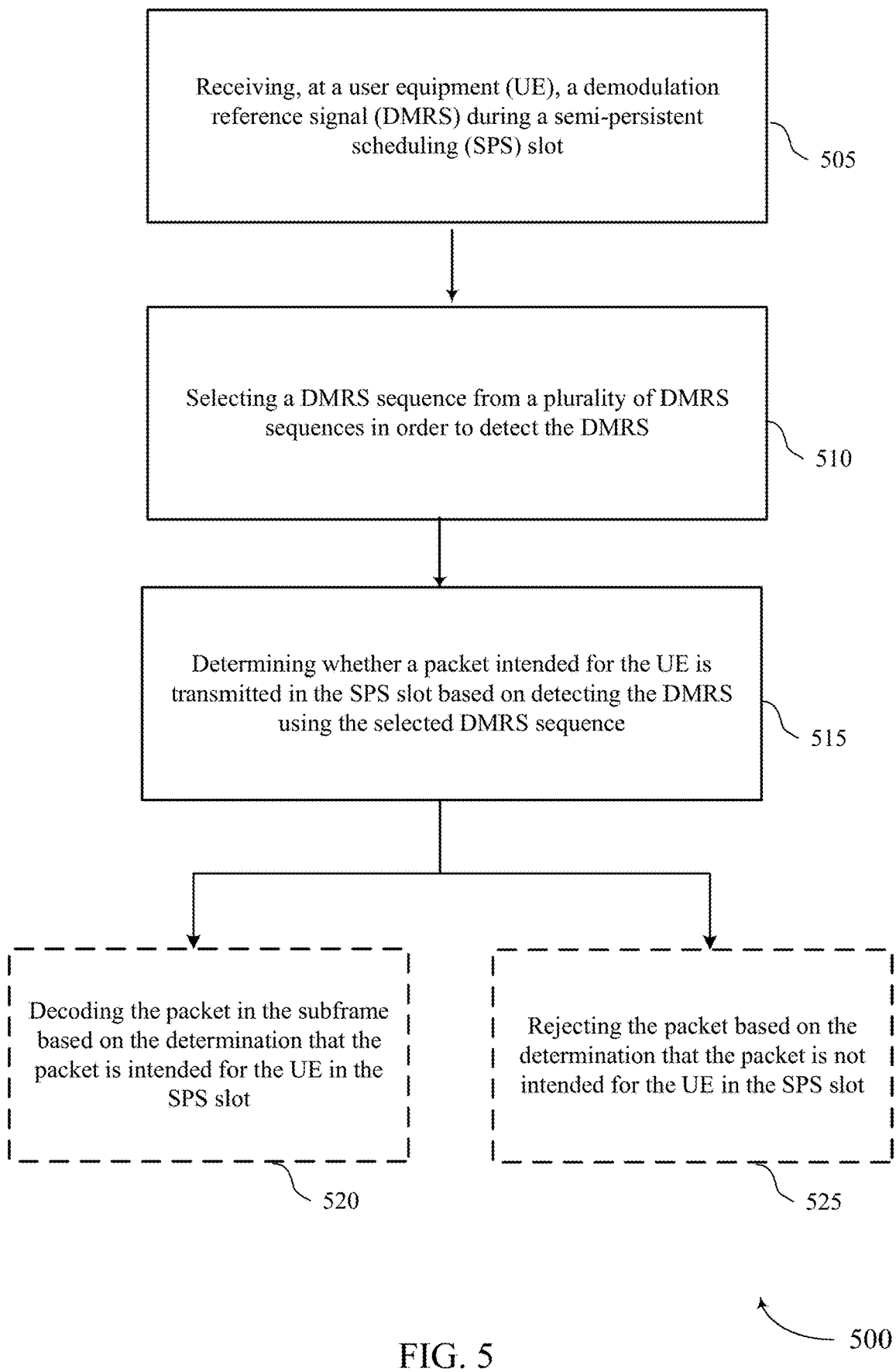
FIG. 5 is an example flowchart of a method of wireless communication implemented by a UE.

FIG. 5 shows a flowchart 500 that supports selecting a DMRS sequence in order to determine whether a packet transmitted during a subframe is intended for the UE in accordance with aspects of the present disclosure. In some examples, UE may execute a set of codes to control the functional elements of the device to perform the described functions. Additionally or alternatively, the system or apparatus may perform aspects of the functions described below using special-purpose hardware.

At block 505, the method may include receiving, at a UE, a DMRS during a SPS slot. In certain examples, aspects of the described operations may be performed by a transceiver 402, and more specifically the receiver 406 as described with reference to FIG. 4A.

At block 510, the method may include selecting a DMRS sequence from a plurality of DMRS sequences in order to detect the DMRS. In some examples, the plurality of DMRS sequences available for selection may be limited by a maximum number of slots (N) that the packet can be offset from its originally assigned slot. For example, if, due to latency requirements, a packet may be moved only by maximum of two slots (e.g., packet scheduled for SPS slot 2 may be allowed to be received at either SPS slots 0-4), the total number of DMRS sequences available would be five different DMRS sequences.

In other examples, selecting a DMRS sequence from a plurality of DMRS sequences may include determining a type of traffic scheduled for transmission during the SPS slot, and selecting the DMRS sequence based on the type of traffic. In such instances, the DMRS sequence may be scrambled across a plurality of packets using multiple resource blocks. Particularly, for the packets of the same type, the base station may use DMRS scrambling across multiple packets of the same type in a much larger frequency band than otherwise available so that detection of which type of packet is transmitted can be more accurately determined by the UE. In certain examples, aspects of the described operations may be performed by a DMRS sequence selection component 465 as described with reference to FIG. 4A.

At block 515, the method may include determining whether a packet transmitted during the SPS slot is intended for the UE based on detecting the DMRS using the selected DMRS sequence. Specifically, the UE may determine if a packet intended for that UE is transmitted in a current SPS slot by detecting if its DMRS signal is also sent in the slot. Because the receiving UE knows the scrambling sequence used for that UE-specific DMRS, the UE may calculate the DMRS using the DMRS sequence. If the UE is able to detect the DMRS using the selected DMRS sequence, the UE, at block 520, may optionally decode the packet included in the subframe. In contrast, if the UE is unable to detect the DMRS using its scrambling sequence, the UE, at block 525, may be able to determine that the packet included in the subframe is not intended for that UE, and as such reject decoding the data portion of the subframe for the packet. In certain examples, aspects of the described operations may be performed by packet processing component 470 as described with reference to FIG. 4A.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving, at a user equipment (UE), a demodulation reference signal (DMRS) during a semi-persistent scheduling (SPS) slot;
   selecting a DMRS sequence from a plurality of DMRS sequences in order to detect the DMRS, wherein the selection of the DMRS sequence is based on one of a slot offset value or a type of traffic; and
   determining whether a packet transmitted during the SPS slot is intended for the UE based on detecting the DMRS using the selected DMRS sequence,
   wherein the selecting the DMRS sequence from the plurality of DMRS sequences based on the slot offset value comprises:
   identifying an assigned SPS slot allocated to the UE by a base station, with the UE scheduled to receive a periodic packet from the base station during the assigned SPS slot;
   determining the slot offset value for the UE based on identification of a difference between the SPS slot and the assigned SPS slot that is allocated to the UE; and
   selecting the DMRS sequence based on the slot offset value.

2. The method of claim 1, wherein the plurality of DMRS sequences available for selection is limited by a maximum number of slots that transmission of the packet can be offset from its originally assigned slot.

3. The method of claim 1, wherein selecting the DMRS sequence from the plurality of DMRS sequences based on the type of traffic comprises:
   determining the type of traffic scheduled for transmission during the SPS slot; and
   selecting the DMRS sequence based on the type of traffic, wherein the DMRS sequence is scrambled across a plurality of packets using multiple resource blocks.

4. The method of claim 1, further comprising:
   decoding the packet included in the SPS slot based on determining that the packet transmitted during the SPS slot is intended for the UE.

5. The method of claim 1, further comprising:
   rejecting the packet included in the SPS slot based on determining that the packet transmitted during the SPS slot is not intended for the UE.

6. A user equipment (UE) for wireless communications, comprising:

a processor; and a memory in communication with the processor, wherein the memory includes instructions executable by the processor to:

receive, at a user equipment (UE), a demodulation reference signal (DMRS) during a semi-persistent scheduling (SPS) slot;

select a DMRS sequence from a plurality of DMRS sequences in order to detect the DMRS, wherein the selection of the DMRS sequence is based on one of a slot offset value or a type of traffic; and determine whether a packet transmitted during the SPS slot is intended for the UE based on detecting the DMRS using the selected DMRS sequence, wherein the select the DMRS sequence from the plurality of DMRS sequences based on the slot offset value comprises:

identify an assigned SPS slot allocated to the UE by a base station, with the UE scheduled to receive a periodic packet from the base station during the assigned SPS slot;

determine the slot offset value for the UE based on identification of a difference between the SPS slot and the assigned SPS slot that is allocated to the UE; and select the DMRS sequence based on the slot offset value.

7. The UE of claim 6, wherein the plurality of DMRS sequences available for selection is limited by a maximum number of slots that transmission of the packet can be offset from its originally assigned slot.

8. The UE of claim 6, wherein the instructions to select the DMRS sequence from the plurality of DMRS sequences based on the type of traffic are further executable by the processor to:

determine the type of traffic scheduled for transmission during the SPS slot; and select the DMRS sequence based on the type of traffic, wherein the DMRS sequence is scrambled across a plurality of packets using multiple resource blocks.

9. The UE of claim 6, wherein the instructions are further executable by the processor to:

decode the packet included in the SPS slot based on determining that the packet transmitted during the SPS slot is intended for the UE.

10. The UE of claim 6, wherein the instructions are further executable by the processor to:

reject the packet included in the SPS slot based on determining that the packet transmitted during the SPS slot is not intended for the UE.

11. A non-transitory computer readable medium for wireless communications comprising code for:

receiving, at a user equipment (UE), a demodulation reference signal (DMRS) during a semi-persistent scheduling (SPS) slot;

selecting a DMRS sequence from a plurality of DMRS sequences in order to detect the DMRS, wherein the selection of the DMRS sequence is based on one of a slot offset value or a type of traffic; and determining whether a packet transmitted during the SPS slot is intended for the UE based on detecting the DMRS using the selected DMRS sequence, wherein the selecting the DMRS sequence from the plurality of DMRS sequences based on the slot offset value comprises:

identifying an assigned SPS slot allocated to the UE by a base station, with the UE scheduled to receive a periodic packet from the base station during the assigned SPS slot;

determining the slot offset value for the UE based on identification of a difference between the SPS slot and the assigned SPS slot that is allocated to the UE; and selecting the DMRS sequence based on the slot offset value.

12. The non-transitory computer readable medium of claim 11, wherein the plurality of DMRS sequences available for selection is limited by a maximum number of slots that transmission of the packet can be offset from its originally assigned slot.

13. The non-transitory computer readable medium of claim 11, wherein the code for selecting the DMRS sequence from the plurality of DMRS sequences based on the type of traffic further comprises code for:

determining the type of traffic scheduled for transmission during the SPS slot; and selecting the DMRS sequence based on the type of traffic, wherein the DMRS sequence is scrambled across a plurality of packets using multiple resource blocks.

14. The non-transitory computer readable medium of claim 11, further comprising code for:

decoding the packet included in the SPS slot based on determining that the packet transmitted during the SPS slot is intended for the UE.

15. The non-transitory computer readable medium of claim 11, further comprising code for:

rejecting the packet included in the SPS slot based on determining that the packet transmitted during the SPS slot is not intended for the UE.

16. An apparatus for wireless communication, comprising:

means for receiving, at a user equipment (UE), a demodulation reference signal (DMRS) during a semi-persistent scheduling (SPS) slot;

means for selecting a DMRS sequence from a plurality of DMRS sequences in order to detect the DMRS, wherein the selection of the DMRS sequence is based on one of a slot offset value or a type of traffic; and means for determining whether a packet transmitted during the SPS slot is intended for the UE based on detecting the DMRS using the selected DMRS, wherein the means for selecting the DMRS sequence from the plurality of DMRS sequences based on the slot offset value comprises:

means for identifying an assigned SPS slot allocated to the UE by a base station, with the UE scheduled to receive a periodic packet from the base station during the assigned SPS slot;

means for determining the slot offset value for the UE based on identification of a difference between the SPS slot and the assigned SPS slot that is allocated to the UE; and means for selecting the DMRS sequence based on the slot offset value.

17. The apparatus of claim 16, wherein the plurality of DMRS sequences available for selection is limited by a maximum number of slots that transmission of the packet can be offset from its originally assigned slot.

18. The apparatus of claim 16, wherein the means for selecting the DMRS sequence from the plurality of DMRS sequences based on the type of traffic comprises:

means for determining the type of traffic scheduled for transmission during the SPS slot; and means for selecting the DMRS sequence based on the type of traffic, wherein the DMRS sequence is scrambled across a plurality of packets using multiple resource blocks.

19. The apparatus of claim 16, further comprising:
means for decoding the packet included in the SPS slot based on determining that the packet transmitted during the SPS slot is intended for the UE.

20. The apparatus of claim 16, further comprising:
means for rejecting the packet included in the SPS slot based on determining that the packet transmitted during the SPS slot is not intended for the UE.

* * * * *